(12) United States Patent
Larter et al.

(10) Patent No.: US 9,401,815 B2
(45) Date of Patent: Jul. 26, 2016

(54) SYSTEM AND METHOD FOR ELECTRICAL DEVICE CONTROL

(75) Inventors: Keith Larter, Georgetown, TX (US); Klaus Bollmann, Georgetown, TX (US)

(73) Assignee: Ringdale, Inc., Georgetown, TX (US)

( * ) Notice: Subject to any disclaimer, the term of this patent is extended or adjusted under 35 U.S.C. 154(b) by 10 days.

(21) Appl. No.: 14/002,191

(22) PCT Filed: Mar. 1, 2012

(86) PCT No.: PCT/US2012/027352
§ 371 (c)(1),
(2), (4) Date: Oct. 29, 2013

(87) PCT Pub. No.: WO2012/119014
PCT Pub. Date: Sep. 7, 2012

(65) Prior Publication Data
US 2014/0050119 A1   Feb. 20, 2014

Related U.S. Application Data

(60) Provisional application No. 61/448,143, filed on Jan. 3, 2011.

(51) Int. Cl.
*H04L 12/28* (2006.01)
*H04B 1/56* (2006.01)
*H04L 12/423* (2006.01)
*H04L 12/433* (2006.01)

(52) U.S. Cl.
CPC .......... *H04L 12/2838* (2013.01); *H04L 12/423* (2013.01); *H04L 12/433* (2013.01); *H04L 2012/285* (2013.01)

(58) Field of Classification Search
CPC .................................................. H04L 12/2838
USPC ........................................................ 370/254
See application file for complete search history.

(56) References Cited

U.S. PATENT DOCUMENTS

| | | | |
|---|---|---|---|
| 6,549,935 B1 * | 4/2003 | Lapstun | B41J 2/17503 709/204 |
| 2006/0154642 A1 | 7/2006 | Scannell | |
| 2007/0273539 A1 | 11/2007 | Gananathan | |
| 2008/0211663 A1 * | 9/2008 | Mansfield et al. | 340/538 |
| 2010/0102926 A1 * | 4/2010 | Grieve et al. | 340/5.1 |
| 2010/0262297 A1 * | 10/2010 | Shloush et al. | 700/276 |
| 2010/0327766 A1 * | 12/2010 | Recker et al. | 315/291 |
| 2011/0109424 A1 * | 5/2011 | Huizenga | G05B 15/02 340/3.1 |
| 2011/0121654 A1 * | 5/2011 | Recker et al. | 307/66 |

* cited by examiner

*Primary Examiner* — Gerald Smarth
(74) *Attorney, Agent, or Firm* — William N. Hulsey, III; Jeffrey D. Hunt; Hulsey Hunt & Parks, P.C.

(57) ABSTRACT

The disclosed subject matter provides a method for installing and controlling a plurality of electrical devices such as lighting, air-conditioning, heating, and access control. The control may be from a plurality of sensors, so that one or more device can be controlled according to a sensor. Sensor types include dimmers, occupancy sensors, temperature sensors, pressure sensors, daylight sensors, On/Off touch sensors, other sensor types, or a combination of sensors.

17 Claims, 8 Drawing Sheets

SYSTEM AND METHOD FOR ELECTRICAL DEVICE CONTROL

CROSS-REFERENCE TO RELATED APPLICATIONS

This application claims priority to U.S. Provisional Patent Application Ser. No. 61/448,143 filed Mar. 1, 2011, which is hereby incorporated by reference in its entirety.

BACKGROUND

The current invention is a system and method for installing and controlling a plurality of electrical devices in a closed or open chain so that a single sensor can communicate with and control all devices in the chain.

SUMMARY

The current invention provides a method for installing and controlling a plurality of electrical devices such as lighting, air-conditioning, heating, and access control. The control may be from a plurality of sensors, so that one or more device can be controlled according to a sensor. Sensor types include dimmers, occupancy sensors, temperature sensors, pressure sensors, daylight sensors, On/Off touch sensors, other sensor types, or a combination of sensors.

In one embodiment, each of a plurality of light devices such as ActiveLED light fixtures are connected in a chain and provided with two communication ports. The devices are linked to form a data ring, which may be closed or open. One or more sensors, such as dimmers, provide control for the devices.

The signaling and protocol allows itself to be used in a simple parallel fashion where all devices are listening to one sender.

The signaling and protocol allows itself to be used in a more complex token-ring type fashion where each listener repeats the signal and sends it on to the next listener.

A device using this protocol will be able to be used in both ways without modification or setup it is the integral behavior of the protocol and signaling.

The Token Ring does not have to be physically closed as the last device not being connected to another device detects this and turns the signal round on its back channel. Because of this the arrangement does not require any MAU but only a 4 wire data cable between devices. As those devices are fixed installations that do not change there is no requirement to deal with devices being added or removed on a frequent basis, which is the main function of a MAU in a token ring environment.

Benefits:

Low cost mass producible electronic devices using low-cost micro-controllers (PIC processors) in a complex environment. Complex because the devices can be connected to and between other devices that are fed from different line phases with significant ground loops that interfere with very low energy data transmissions.

The devices have been proven to allow 1000 foot data wiring in between devices on different phases.

The protocol by its nature has a very high degree of robustness to errors in the data. This allows rollout of significant installations with thousands of devices being controlled by one device.

These and other advantages of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages included within this description be within the scope of the claims.

BRIEF DESCRIPTION OF THE DRAWINGS

The features, nature, and advantages of the disclosed subject matter will become more apparent from the detailed description set forth below when taken in conjunction with the drawings, in which like reference numerals indicate like features and wherein.

DETAILED DESCRIPTION

Although the present subject matter is described with reference to specific embodiments, one skilled in the art could apply the principles discussed herein to other areas and/or embodiments without undue experimentation.

Multiple Device Controller and Sensor Method

This embodiment is described as a method for a plurality of dimmer sensors to control lighting devices. In other embodiments, other sensor types or combination of sensor types may be used to control lighting or other devices.

Figure 1:
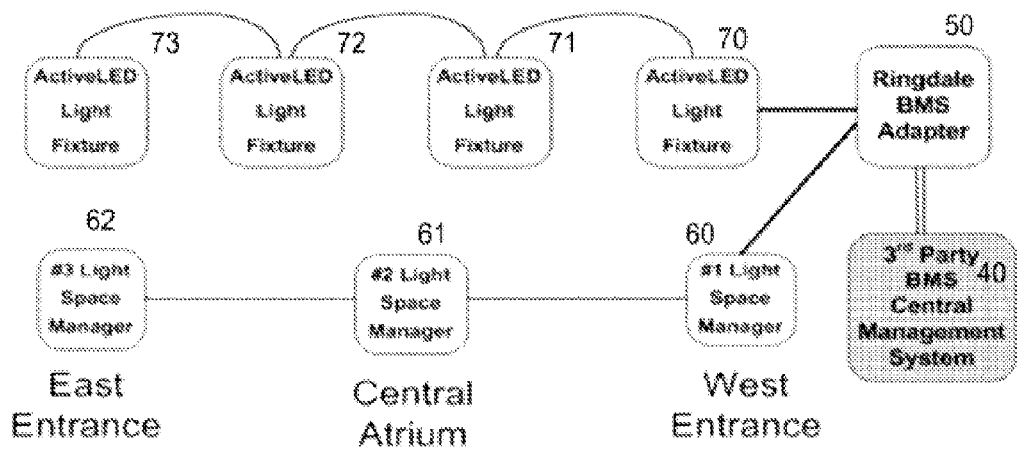
FIG. 1 is a simplified example schematic of an Adapter in communication with a management system, three light space managers, and a chain four ActiveLED light fixtures.

FIG. 1 is a simplified schematic of a Ringdale BMS Adapter 50, in communication with a third party management system 40; three light space managers 60, 61, and 62; and a chain of ActiveLED light fixtures 70, 71, 72, and 73. In this example, the ActiveLED light fixtures are connected by 4-wire RJ11/RJ12 Communications Cables, and the light space managers are connected by 6-wire RJ12 Communications Cables.

This example dimmer method assumes that all the dimmers are connected at power up. It does not allow for another dimmer to be added to or removed from the chain on the fly. If a new dimmer is added, or one is removed, the power should be cycled to rebuild the chain.

Start Up

At start up, the dimmer devices determine whether they are a master, slave, or terminating slave.

Figure 2:
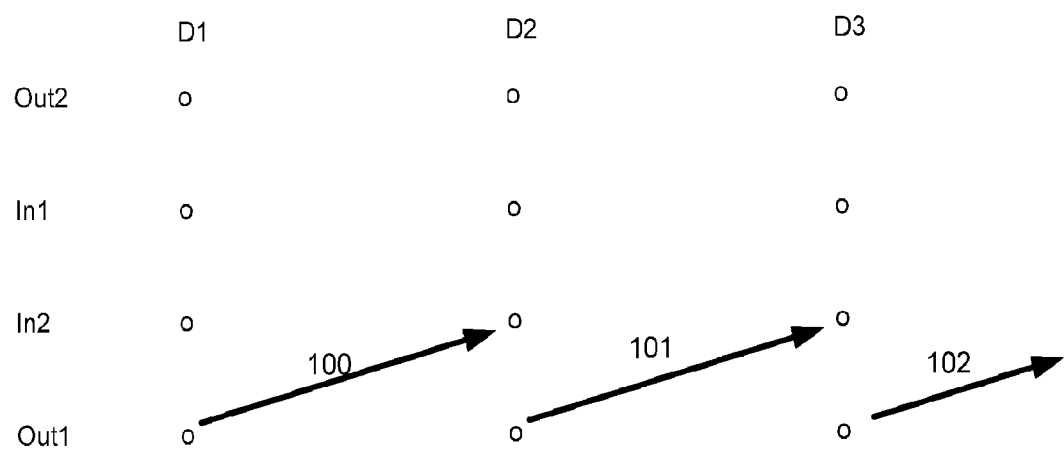
FIG. 2 is an example schematic of 3 dimmers showing communication between a master and slave dimmers at start up.

FIG. 2 is an example schematic of 3 dimmers D1, D2, and D3 showing communication between a master and slave dimmers at start up. Signals 100, 101, and 102 are sent from the Comm1_OUT port of a device to the next device in a chain.

The dimmers determine their position in the chain. The first dimmer attached to the lights will be the Master. Any others in between will be Slaves. The final slave in the chain will be the Terminator.

Phase 1: All Dimmers switch on Comm1_OUT (shown as Out1).

Figure 3:
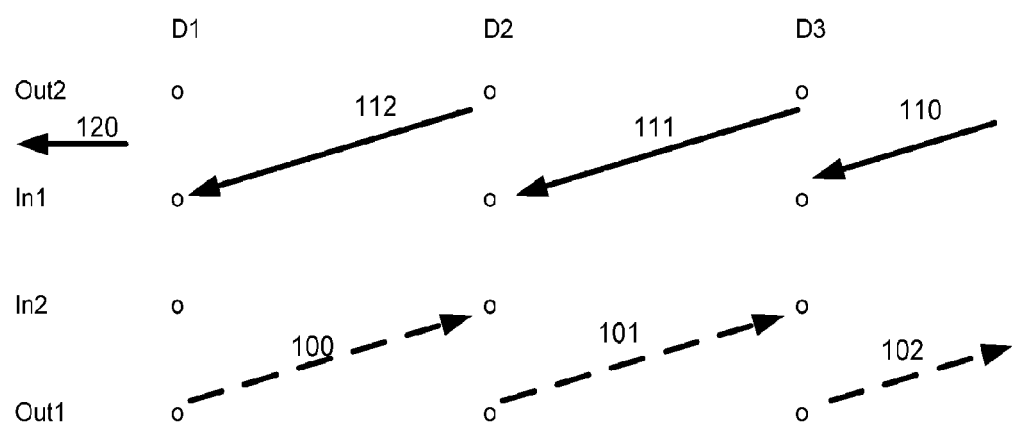
FIG. 3 is an example schematic of the dimmers D1, D2, and D3 of FIG. 2 after a small delay.

FIG. 3 is an example schematic of the dimmers D1, D2, and D3 of FIG. 1 after a small delay. Signals 110, 111, and 112 are sent received from downstream devices and sent to the previous device in a chain. Signal 120 is the return signal detected by master sensor D1.

Phase 2: After a small delay, D2 and D3 detect the signal on Comm2_IN and assert Comm2_OUT. The presence of the signal tell them they are slaves. D1 sees no signal and has determined it is the master.

Phase 3: Master (D1) does nothing. The slaves read Comm1_IN. The absence of a signal at D3 indicates it is the Terminating Slave.

Phase 4: After a small delay, all outputs are turned off.

After a half-second wait, the master dimmer will send the On and Low light levels to the others in the chain.

Running

While running, the dimmer devices form a data ring.

Figure 4:
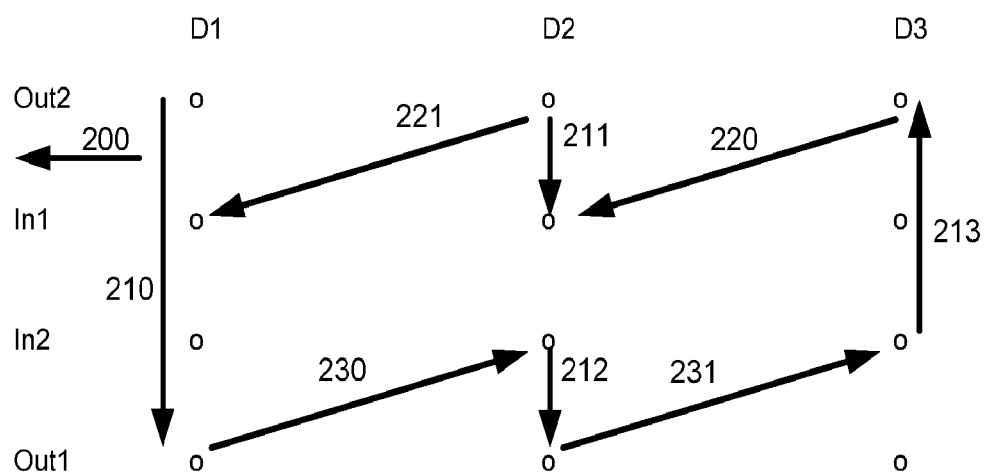
FIG. 4 is an example schematic of the dimmers D1, D2, and D3 of FIG. 2 forming a data ring in a running mode.

FIG. 4 is an example schematic of the dimmers D1, D2, and D3 of FIG. 1 forming a data ring in a running mode. Signal 200 represents new light level data. Signals 210, 211, 212, and 213 represent the internal movement of data in a sensor device. Signals 220 and 221 represent returning, adjusted data. Signals 230 and 231 represent a change such as new mode, new parameter, or immediate instruction.

The two communications ports in each dimmer are used to form a data ring. The diagram shows D1 as the master, D2 as a slave and D3 as the terminating slave.

The master dimmer transmits instructions to the lights. It also initiates the packet in the ring.

At any time a user changes the settings on a dimmer, the new level or mode is noted and the newLevelFlag is set. The requested change will be sent to the master in the next packet to go around the ring.

Master Dimmer Function

Transmits the current light level to the lights repeatedly on Comm2_OUT.

Initiates packets in the dimmer ring and updates other dimmers.

Figure 5:
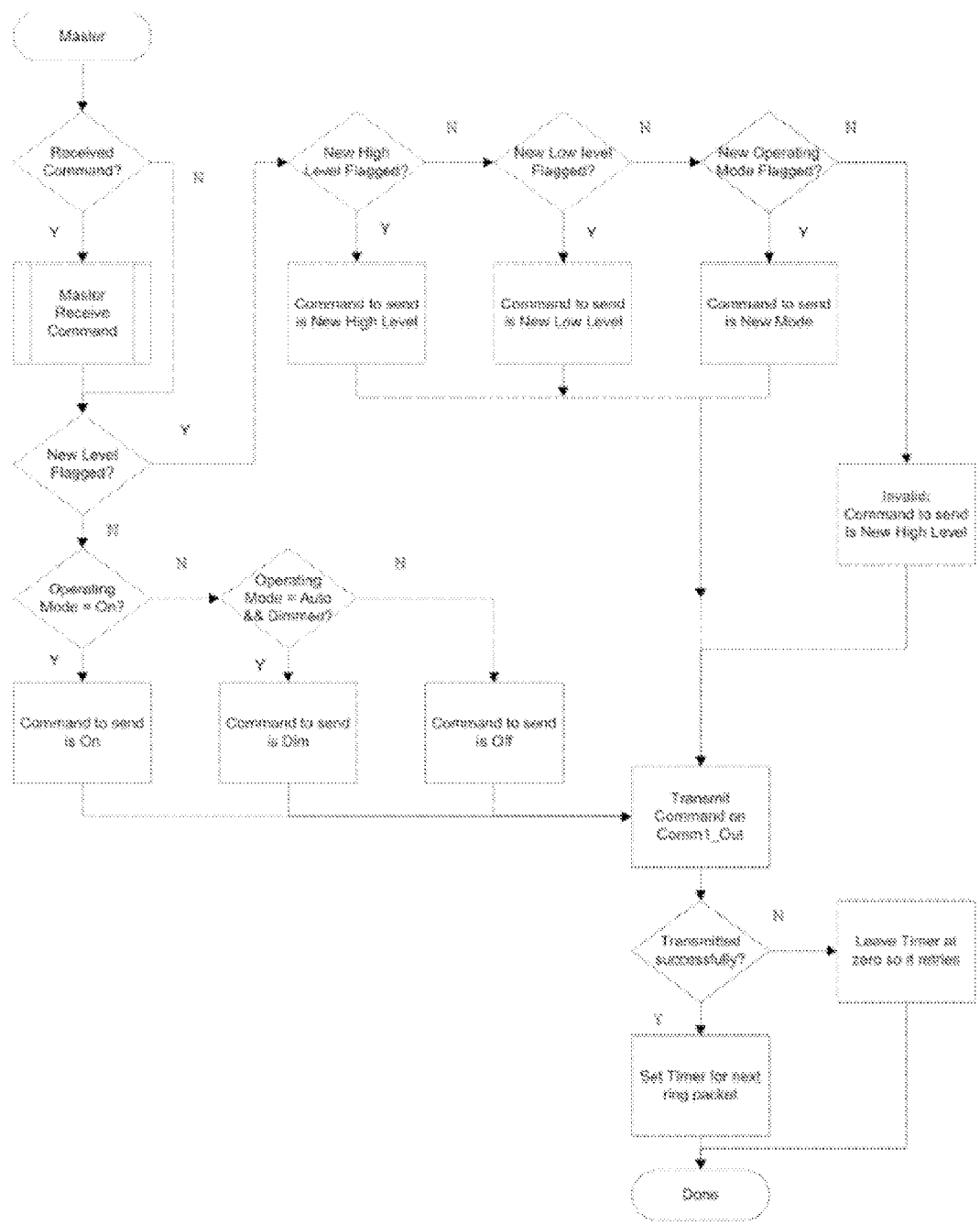
FIG. 5 is a flow chart for a master dimmer function in receiving and transmitting a command.

FIG. 5 is a flow chart for a master dimmer function in receiving and transmitting a command.

Figure 6:
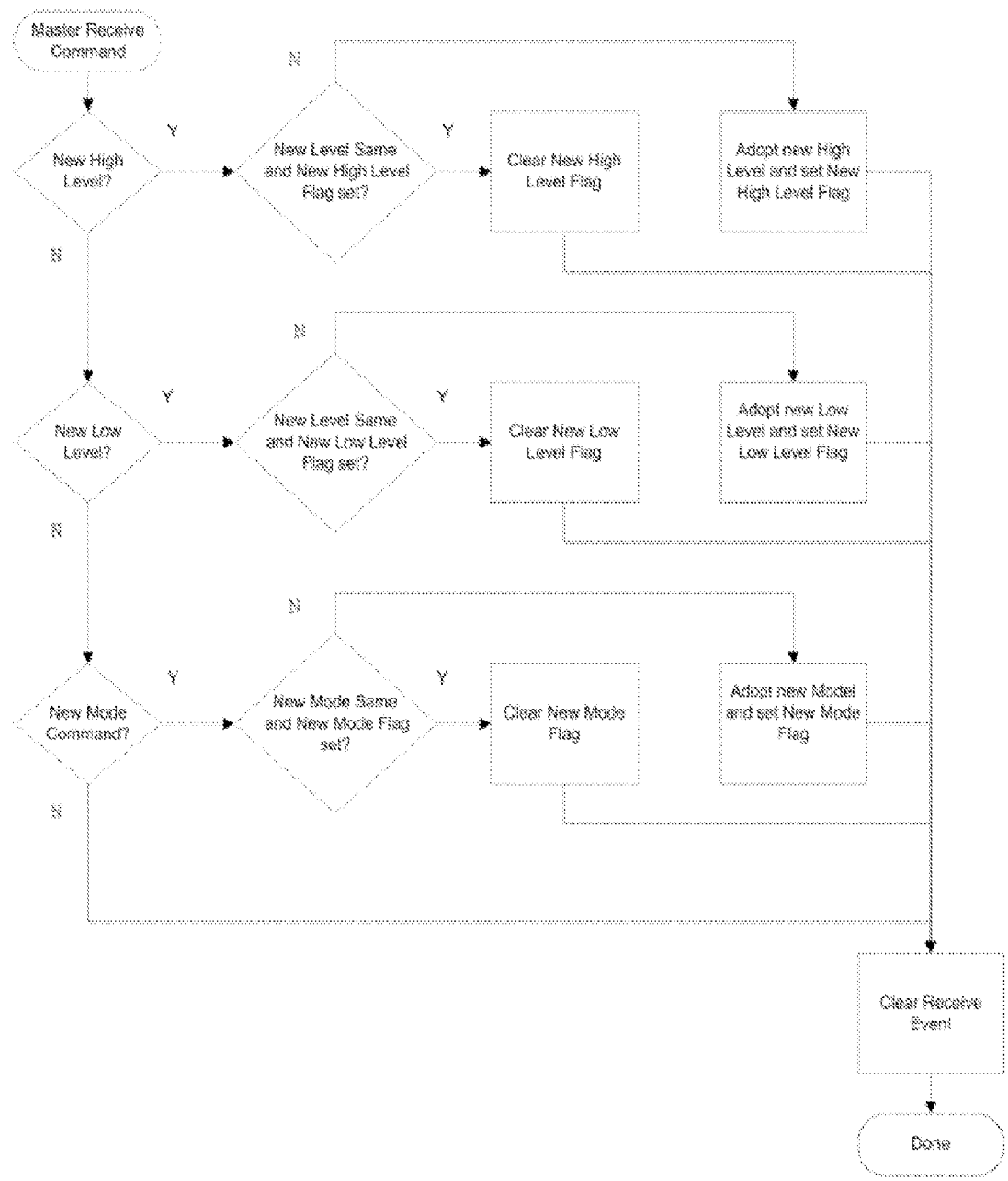
FIG. 6 is a flow chart for a master dimmer function in receiving and processing a command.

FIG. 6 is a flow chart for a master dimmer function in receiving and processing a command.

Slave Dimmer Function

Receives new instructions from the master dimmer.

Requests new light level

Notify Master of motion detect

Figure 7:
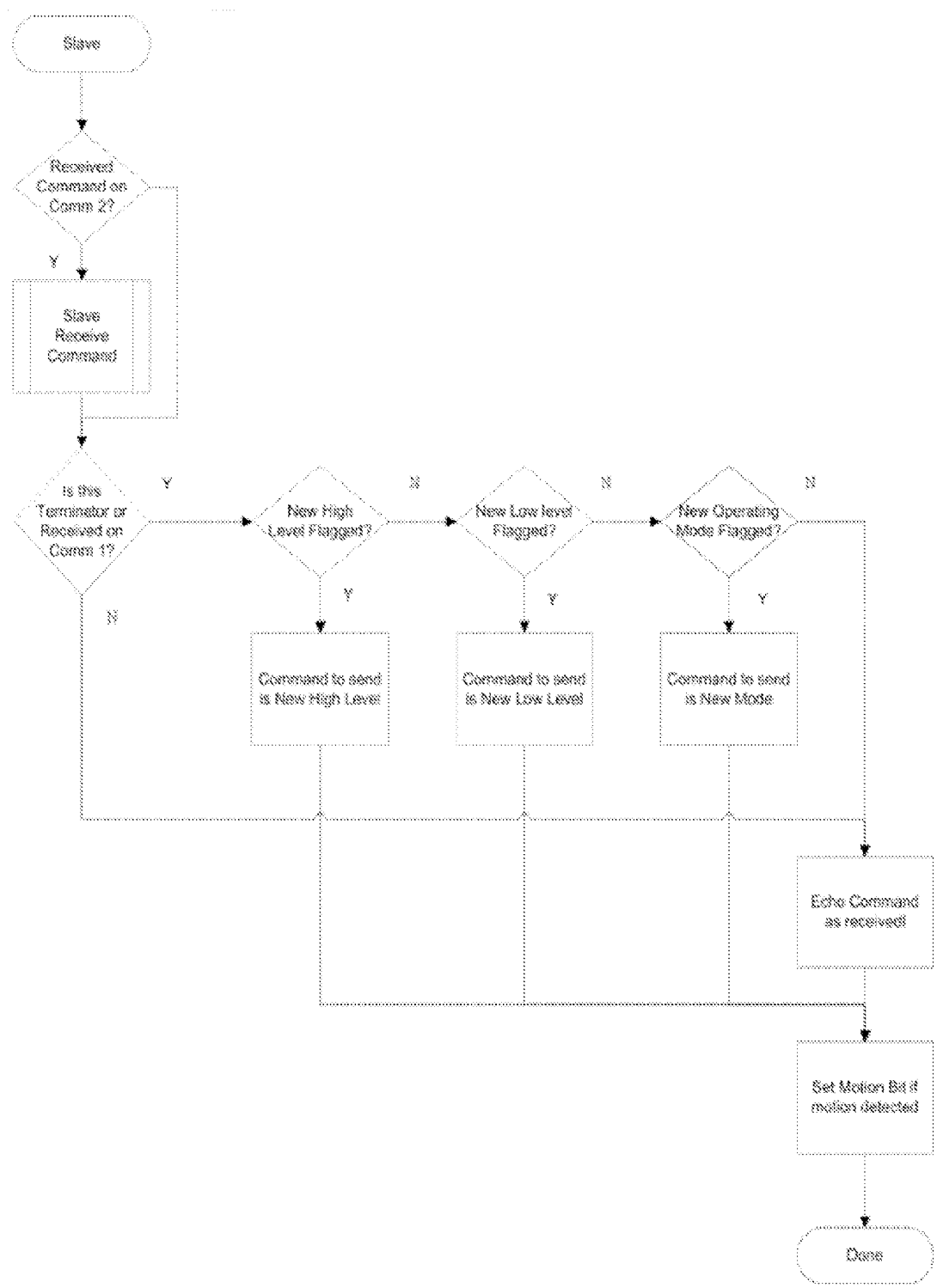
FIG. 7 is a flow chart for a slave dimmer function in determining if it is a terminator, and in echoing a command.

FIG. 7 is a flow chart for a slave dimmer function in determining if it is a terminator, and in echoing a command.

Figure 8:
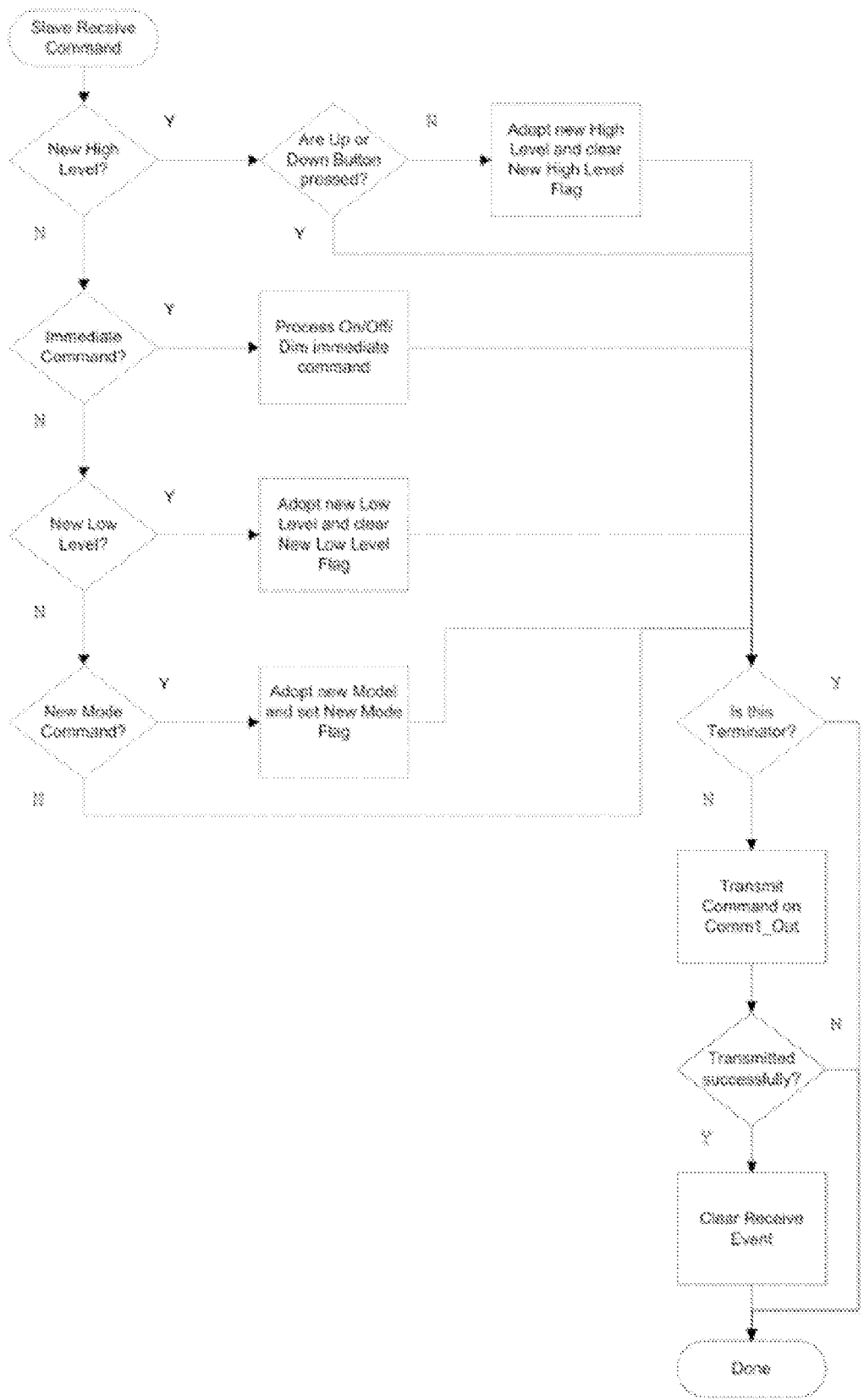
FIG. 8 is a flow chart for a slave dimmer function for receiving and processing a command.

FIG. 8 is a flow chart for a slave dimmer function for receiving and processing a command.

Applicant owns the following US Patents related to token ring. These and all other referenced patents and applications are incorporated herein by reference in their entirety. Where a definition or use of a term in an incorporated reference is inconsistent or contrary to the definition of that term provided herein, the definition of that term provided herein applies and the definition of that term in the reference does not apply U.S. Pat. No. 5,436,624
U.S. Pat. No. 5,459,440
U.S. Pat. No. 5,515,404
U.S. Pat. No. 5,541,853
U.S. Pat. No. 5,548,280
U.S. Pat. No. 5,654,961
U.S. Pat. No. 5,659,273
U.S. Pat. No. 5,825,259
U.S. Pat. No. 5,710,777
U.S. Pat. No. 5,754,551
U.S. Pat. No. 5,805,598
U.S. Pat. No. 5,905,712
U.S. Pat. No. 5,924,112
U.S. Pat. No. 5,539,020
U.S. Pat. No. 5,926,048
U.S. Pat. No. 5,961,597
U.S. Pat. No. 5,991,295
U.S. Pat. No. 6,018,518
U.S. Pat. No. 6,021,117
U.S. Pat. No. 6,101,553
U.S. Pat. No. 6,172,964
U.S. Pat. No. 6,201,816
U.S. Pat. No. 6,275,549
U.S. Pat. No. 6,351,725

In one example, this method may be used over copper wires. In another example, the protocol and appropriate signaling can be used via two uni-directional or one bi-directional fiber optic connection(s) between the devices. This approach could increase the potential distance between devices and improve data errors—it may also reduce cost of communication between the devices in case copper and gold prices increase further.

The scope of the current invention is not limited to the specific examples and embodiments described above. The system and method are applicable to various sizes of chained devices and to multiple sensor types. Those with ordinary skill in the art will recognize that the disclosed embodiments have relevance to a wide variety of areas in addition to those specific examples described above.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

It is intended that all such additional systems, methods, features, and advantages that are included within this description be within the scope of the claims.

What is claimed is:

1. A method for electrical device control, said method comprising:
    connecting a plurality of sensors in a chain;
    communicating between said plurality of sensors to automatically assign and independently determine by each of said plurality of sensors a network configuration of each of said plurality of sensor in said chain by sending signals between said plurality of sensors;
    said network configuration of each of said plurality of sensors selected from a group, said group consisting of: master; slave; and
    terminating slave, said chain comprising at least a master;
    detecting of a return signal by a master sensor;
    disabling of all output signals; and running of said plurality of sensors to form a data ring in a configuration selected from the group consisting of:

in an open loop; and in a closed loop, wherein the communicating between said plurality of sensors is configured in a parallel fashion and said plurality of sensors listen to one sender;

wherein each of said plurality of sensors self-determines said network configuration.

2. The method of claim 1, wherein said plurality of sensors is comprised of a master sensor and at least one slave sensor.

3. The method of claim 2, wherein said at least one slave sensor is further comprised of a terminating slave sensor.

4. The method of claim 1, further comprising using said plurality of sensors to control an electrical device.

5. The method of claim 4, wherein said electrical device may be lighting, air-conditioning, heating, or access control.

6. The method of claim 1, wherein said plurality of sensors may be comprised of dimmers, occupancy sensors, temperature sensors, pressure sensors, daylight sensors, on/off sensors, or other sensor types.

7. The method of claim 1, wherein said data ring may be open or closed.

8. The method of claim 1, further comprising the step of operating in a parallel manner.

9. The method of claim 1, further comprising a step of operating in a token-ring fashion.

10. The method of claim 1, further comprising a step of receiving at least one new instruction and processing said instruction.

11. A system for electrical device control, said system comprising:

a data ring comprised of a plurality of sensors linked in a chain, wherein said plurality of sensors is comprised of a master sensor and at least one slave sensor, and further wherein at least one slave sensor is further comprised of a terminating slave sensor; and an electrical device in communication with said master sensor; and wherein each of the plurality of sensors in the chain is configured to self-determine a network configuration, said network configuration being selected from the group consisting of: a master, a slave, and a terminating slave, said master sensor configured to detect a return signal; and said master sensor configured to disable all output signals;

wherein said network configuration is selected from the group consisting of:

in an open loop; and in a closed loop, wherein the communicating between said plurality of sensors is configured in a parallel fashion and said plurality of sensors listen to one sender;

wherein each of said plurality of sensors self-determines said network configuration.

12. The system of claim 11, wherein said electrical device may be lighting, air conditioning, heating, or access control.

13. The system of claim 11, wherein said plurality of sensors may be comprised of dimmers, occupancy sensors, temperature sensors, pressure sensors, daylight sensors, on/off sensors, or other sensor types.

14. The system of claim 11, wherein said data ring may be open or closed.

15. The system of claim 11, wherein said data ring may be a token ring.

16. The system of claim 11, further comprised of an adapter communicably coupled between said master sensor and said electrical device.

17. The system of claim 16, further comprised of a third party management system communicably coupled to said adapter.

* * * * *